July 24, 1956

O. WINKLE 2,755,948

SPARE WHEEL HOLDER

Filed March 16, 1953

INVENTOR

*Ottmar Winkle*

BY

*Bailey, Stephens & Huettig*
ATTORNEYS

July 24, 1956

O. WINKLE 2,755,948

SPARE WHEEL HOLDER

Filed March 16, 1953

INVENTOR

*Ottmar Winkle*

BY

*Bailey, Stephens & Huettig*
ATTORNEYS

United States Patent Office 2,755,948
Patented July 24, 1956

2,755,948

SPARE WHEEL HOLDER

Ottmar Winkle, Nurnberg, Germany, assignor to Maschinenfabrik Augsburg-Nurnberg A. G., Nurnberg, Bavaria, Germany Application March 16, 1953, Serial No. 342,549

3 Claims. (Cl. 214—454)

This invention relates to a spare wheel or spare tire holder for motor vehicles of the type permitting exchange, even in case of heavy wheels or tires, by a single person, and has for one of its objects to generally improve the construction and operation of such devices to provide a compact, simple article of this class which will be inexpensive in the cost of manufacture although strong and durable and easy to handle.

With this and further objects in view, this invention consists in the details of construction, combination of elements and operation hereinafter set forth and then specifically designated by the claims.

In order that those skilled in the art to which this invention appertains may understand how to make and use the same, I will describe its construction in detail, referring by numerals to the accompanying drawings forming part of this application, in which.

Similar reference numerals denote similar parts in the different views.

Figure 1:
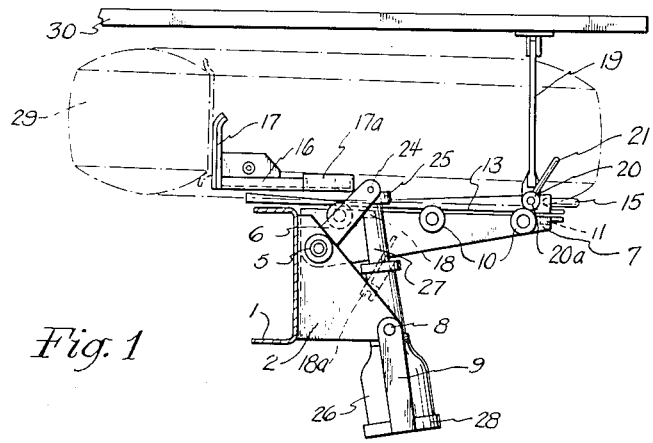
Fig. 1 is a side elevational view of the spare tire holder in up position.

Referring to the drawings in greater detail, it will be seen that brackets 2, 3, and 4 are fixedly arranged on the longitudinal bearer or frame member 1 of the frame or chassis. Rotatably mounted in the brackets is a shaft 5 with which in turn are fixedly connected the side legs 6 of a U-member consisting of side legs 6 and cross bar 24, and the side legs 7 of a U-member consisting of side legs 7 and a cross bar 11. Flanged rollers 10 are rotatably mounted on the outer side of legs 7. A slidable frame consisting of slide rails 13, a cross bar 14 and a cross bar 15 rigidly connecting the slide rails 13 is shiftably supported on these rollers 10, cross bar 15 simultaneously forming a handle. A projecting member 16 is welded to the cross bar 14, on the same level as the latter, Fig. 3, and stiffened lugs 17, 17a, and 17b project from the member 16 and from the cross bar 14, respectively, being spaced at about equal distances from the center of the cross bar 14 and rounded to conform to the inner curvature of the rim of the spare wheel or tire 29. The slidable frame 13, 14, 15 can be drawn out from the position shown in solid lines in Fig. 1 to the position shown in Fig. 2 which latter position is defined by stops 18, Fig. 1, cooperating with the cross bar 11 of the U-member 7, 11. Swingably suspended from the cross bearers 30 of the carriage body or from the carriage body itself, by means of joints 19', are struts 19 which in the normal or horizontal position of slide 13, 14, 15 are engaged, by bores in their lower ends, over screw bolts 20 projecting from the outer faces of the rails 13 and held thereon by lever-operated or wing nuts 21. Bores 20a of the screw bolts 20 may serve to pass therethrough the U-members of locks so as to prevent unauthorized persons from swinging down the member 7, 11 and member 13, 14, 15. Flanges 22 bent at right angles from the legs 7 cooperate with complementary angle irons 23 secured to the rails 13 to ensure joint swinging movement of the U-members 7, 11 and 13, 14, 15, irrespective of which of them is directly exposed to a force causing upward or downward swinging thereof.

The cross bar 24 of the U-member 6, 24 is rotatably but non-slidably secured in the legs 6 and fixedly connected with a cup member 25 adapted to embrace the piston 27 of a lifting jack 26 in such a way that the inner face of the cup abuts the end face of the piston, while the cylinder or casing 26 of the jack can be placed upon a seat 28 which is hingedly suspended from the brackets 2, at 8, by links 9.

Figure 2:
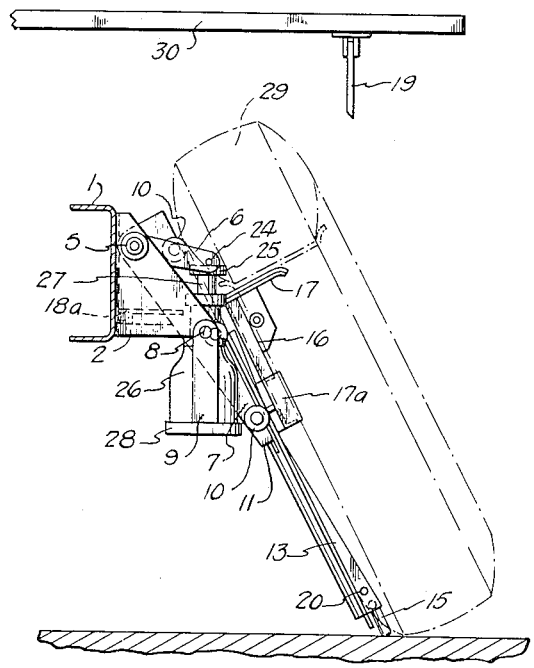
Fig. 2 is a like view with the spare tire holder in down position.
Figure 3:
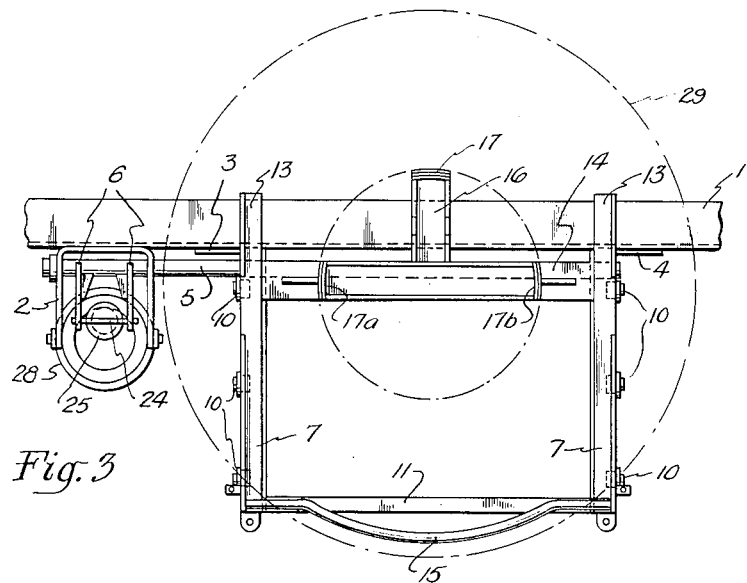
Fig. 3 is a plan view of Fig. 1.
Figure 4:
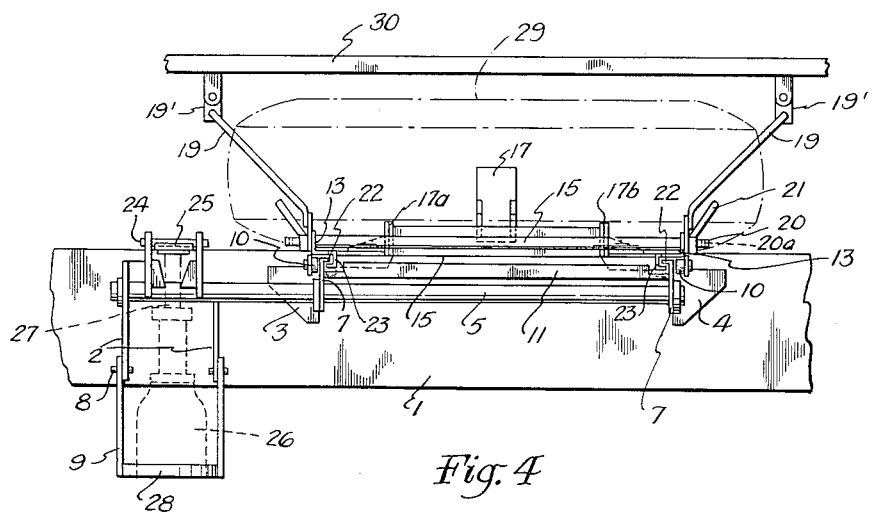
Fig. 4 is a side elevational view of Fig. 1.

The device is operated as follows:

In order to mount a spare tire or wheel 29, the nuts 21 are released and the struts 19 are disengaged from the screw bolts 20. Now the lifting jack 26, 27 is inserted between members 28 and 25, slide 13—15 is drawn out, by gripping the outwardly bulged handle of cross bar 15, up to the end position defined by engagement of stop 18 with cross bar 11, and swung downwards, taking the U-member 7, 11 with it into the position defined by engagement of stop 18a, as indicated in Fig. 2. Next the spare tire 29 to be mounted is rolled into face to face position with slide 13, 14, 15 and tilted upon the same in such a way that the rim of the tire embraces the lugs 17, 17a, 17b. Rubbing of the spare tire 29 on the slide rails 13 is advantageously prevented by means of wooden strips (not shown) provided thereon. Now the lifting jack 26 is operated and acts to swing the U-member 6, 24, through cup 25, in such a way that the slide 13, 14, 15 is swung back into its horizontal position, through shaft 5 and member 7, 11. When the horizontal position is reached, the slide 13, 14, 15 is rolled back into its normal position on rollers 10, together with the tire held thereon in a central position by the lugs 17, 17a, 17b. The struts 19 are engaged over the screw bolts 20 and secured or locked in the manner as hereinbefore described. At last the piston 27 of the lifting jack 26 is caused to return by opening the lowering branch thereof (not shown) and the lifting jack is removed from the seat 28 so as to be put back into the tool case.

If it is intended to take the spare tire from the spare tire holder, the lifting jack 26 is again inserted between members 28 and 25 and operated until its piston engages cap 25 with a slight pressure. Next the struts 19 are removed, slide 13—15 with spare tire 29 is drawn out and the lowering branch of the lifting jack is opened, whereby the U-member 7, 11 and slide 13, 14, 15 are swung downwards, following the receding piston 27 and taking with them the spare tire which can be removed by tilting it away from slide 13, 14, 15 and rolling it off.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

I claim:

1. A spare tire holder device for motor vehicles including a carriage frame, comprising a swingable spare tire holder, hinge means for securing said holder to the carriage frame of the vehicle for movement from a horizontal position to a substantially vertical position and vice versa, means hinged to the carriage frame of the vehicle for forming a stationary abutment for a removable lifting jack temporarily inserted in said device, and means attached to said tire holder for forming a movable abutment for the piston of the lifting jack for swinging said tire holder from said lower position to said upper position and vice versa, by operation of the said jack.

2. A spare wheel device for motor vehicles including a carriage frame, comprising bearing brackets secured to the said carriage frame of the vehicle, a shaft rotatably mounted in said brackets, a spare wheel holder fixedly secured for rotation with said shaft, a U-member mounted for rotation with said shaft, a cup secured to said U-member, and means suspended from said carriage frame forming a stationary abutment for a lifting jack adapted to be inserted between said abutment and said cup for swinging said spare wheel holder downwards from its normal substantially horizontal position and vice versa, upon operation of the jack.

3. A spare tire holder device for motor vehicles including a carriage frame, comprising bearing brackets secured to the carriage frame of the vehicle, a shaft rotatably mounted in said brackets, a spare tire holder including a carrier member secured to said shaft for rotation therewith, a slide member having means for securing a spare tire in position upon said slide member and being slidably movable on the carrier member in a direction at right angles to the said shaft from a normal closed position to a drawn-out position, a U-member fixed to said shaft for rotation therewith, a cup secured to said U-shaped member for rotation therewith, means suspended from the carriage frame of the vehicle forming a stationary abutment for a lifting jack adapted to be inserted between the statitonary abutment and the cup, and for swinging said spare tire holder downwards from its normal substantially horizontal position and vice versa, upon operation of said jack.

References Cited in the file of this patent

UNITED STATES PATENTS

| | | |
|---|---|---|
| 1,813,094 | Appel | July 7, 1931 |
| 1,868,560 | Beach et al. | July 26, 1932 |
| 1,913,835 | Golike | June 13, 1933 |
| 2,028,945 | Morrison | Jan. 28, 1936 |
| 2,131,746 | Morrison | Oct. 4, 1938 |
| 2,293,194 | Claus et al. | Aug. 18, 1942 |
| 2,400,274 | Ullman | May 14, 1946 |

FOREIGN PATENTS

| | | |
|---|---|---|
| 302,801 | Great Britain | Dec. 27, 1928 |